United States Patent [19]

Ivanchev et al.

[11] 4,214,914

[45] Jul. 29, 1980

[54] METHOD FOR PRODUCING MINERAL FILLERS CONTAINING GRAFT HYDROPEROXIDE GROUPS FOR USE WITH POLYMERS

[76] Inventors: Sergei S. Ivanchev, ulitsa Nalichnaya, 36/3, kv. 97, Leningrad; Nikolai S. Enikolopov, Kutuzovsky prospekt, 26, kv. 245, Moscow; Boris V. Polozov, prospekt Smirnova, 20/3, kv. 32, Leningrad; Anatoly A. Syrov, ulitsa III Internatsionala, 52, kv. 51, Leningrad; Oleg N. Primachenko, Suzdalsky prospekt, 38/1, kv. 13, Leningrad; Zorislav N. Polyakov, ulitsa Petra Smorodina, 18, kv. 8, Leningrad, all of U.S.S.R.

[21] Appl. No.: 962,191

[22] Filed: Nov. 20, 1978

[30] Foreign Application Priority Data

Dec. 6, 1977 [SU] U.S.S.R. .................. 2546852

[51] Int. Cl.$^2$ .................................... C09C 1/28
[52] U.S. Cl. .................. 106/308 Q; 106/287.15; 106/288 B; 106/309; 260/42.15; 556/436; 556/441; 556/449; 556/465; 427/219; 427/337; 428/405; 428/406; 526/194
[58] Field of Search ............... 260/42.15, 448.8 AS; 106/288 B, 308 Q, 308 M, 309, 287.15; 427/219, 337; 428/404, 405, 406, 407; 526/194

[56] References Cited

U.S. PATENT DOCUMENTS

| | | | |
|---|---|---|---|
| 2,834,693 | 5/1958 | Jellinek | 106/287.15 |
| 2,851,474 | 9/1958 | Pines et al. | 106/287.15 |
| 3,450,686 | 6/1969 | Mortimer | 260/448.2 R |
| 3,514,318 | 5/1970 | Marzocchi et al. | 260/42.15 |
| 3,629,297 | 12/1971 | Antonen | 260/378 B |
| 3,929,502 | 12/1975 | Hodgkin et al. | 106/308 Q |
| 3,963,512 | 6/1976 | Swift et al. | 106/308 Q |

FOREIGN PATENT DOCUMENTS

1456865 12/1976 United Kingdom .................. 260/42.15

OTHER PUBLICATIONS

*Reviews in Polymer Technology*, Ed. by I. Skeist, 1, N.Y.C., (1972), pp. 1–49.
Mod. Plast. Intern., 6, No. 6, (1976), pp. 28, 31.
Plueddeman, E. P. et al., "Role of Coupling Agents in Surface Modification of Fillers"–Modern Plastics, Aug. 1977.

*Primary Examiner*—Helen M. McCarthy
*Attorney, Agent, or Firm*—Lackenbach, Lilling and Siegel

[57] ABSTRACT

According to the invention, the method for producing mineral polymer fillers containing graft hydroperoxide groups consists in treating mineral fillers at a temperature of 50° to 150° C. and a pressure of 1.33.10$^2$ to 4.10$^5$ Pa (1 mm Hg to 4 atm) with organosilicon compounds of the general formula:

$$R_{4-y}SiX_y$$

or $$R'R_{3-z}SiX_z,$$

where
R is vinyl, allyl or norbornyl,
X is chlorine, alkoxy or acyloxy,
y=1–3,
z=1–2,
R' is methyl, ethyl or propyl, whereupon the mineral filler containing graft unsaturated groups is separated from the reaction mixture, dried and ozonized with an ozone-oxygen mixture containing 4 to 6 percent by volume of ozone at a temperature of −20° C. to +20° C. in an aliphatic saturated monohydric alcohol or aliphatic saturated monohydric acid.

The method for producing mineral polymer fillers containing graft hydroperoxide groups is quite simple and makes it possible to carry out the filling and grafting of polymers at a reduced temperature of 50° to 140° C.

1 Claim, No Drawings

METHOD FOR PRODUCING MINERAL FILLERS CONTAINING GRAFT HYDROPEROXIDE GROUPS FOR USE WITH POLYMERS

FIELD OF THE INVENTION

The present invention relates to the field of producing mineral fillers for polymers and, more particularly, to a method for producing novel mineral polymer fillers containing graft hydroperoxide groups.

Mineral fillers containing graft hydroperoxide groups are applicable to the production of filled polymers exhibiting improved mechanical properties and aging resistance under severe conditions and can be used in such fields as the automotive industry, radio and electrical engineering, and construction.

BACKGROUND OF THE INVENTION

The growing demand for high-strength polymer materials has enhanced the importance of reinforced filled polymers. Such reinforcers as glass and mineral fiber, metals, oxides or metals, etc. help to improve the properties of polymers. To produce a high-strength polymer, it is necessary to ensure good adhesion of the filler to the polymer. There are different compounds, referred to as finishing agents, that help to improve the adhesion. There are bifunctional monomer compounds which react with both the mineral filler and the polymer. A finishing agent is normally applied onto the surface of a filler; a filler may be treated with vapor of a finishing agent; finally, a filler may be mixed with a powdered finishing agent. After such a treatment, the filler is added to the polymer. According to another technique, a finishing agent is introduced into the polymer where it is driven to the surface of the filler in the course of mixing. Filled polymers thus produced exhibit improved mechanical properties and increased aging resistance under severe conditions (cf. G. D. Andreyevskaya, "Vysokoprochnye orientirovannye stekloplastiki" /"Oriented High-Strength Glass-Rein-forced Plastics"/, Nauka Publishers, Moscow, 1966, p. 240; "Armirovannye polymernye materialy" /"Reinforced Polymer Materials"/, Collected Reviews and Translations from Foreign Periodicals, Mir Publishers, 1968, pp. 91, 122; "Synteticheskiye polymernye materialy" /"Synthetic Polymer Materials"/, Express Information Bulletin, Nos 36 and 38, 1976).

There is known a method for producing mineral fillers for polymers, such as polystyrene, polyethylene, and polypropylene, whereby mineral fillers are treated at a temperatue of 50° to 150° C. with finishing agents which are organosilicon compounds of the formula:

$$R_{4-y}SiX_y,$$

where R is an organic functional group capable of reacting with the polymer; X is a halogen, or an alkoxy or an acyloxy group; and y=1, 2, 3 (cf. Reviews in Polymer Technology, ed. by J. Skeist, 1, New York, 1972, pp. 1–49).

However, in order to ensure satisfactory physico-mechanical properties of filled polymers, one must select finishing agents containing specific R and X groups which are determined by the type of filler and the type of polymer. Besides, finishing agents of the above structure cannot be used for different types of polymers.

There is further known a method for producing mineral fillers containing graft peroxide groups and intended for polyethylene and polysulfones. According to this method, mineral fillers are treated with a finishing agent of the general formula:

$$CH_2=CHSi[OOC(CH_3)_3]_3,$$

which is an organosilicon peroxide. The finishing agent is applied onto the mineral filler which is then added to a polymer at a temperature of 175° to 230° C. The heated peroxide produces free radicals which initiate the grafting of the polymer to the filler (cf. Mod. Plast. Intern., 6, No 6, pp. 28, 31 /1976/).

The application of the foregoing finishing agent is limited because of the high decomposition temperature of the organosilicon peroxide. This finishing agent is readily hydrolyzable by air moisture and calls for special storage conditions. Besides, the synthesis of this finishing agent is a complicated and costly process.

The literature offers no information on methods for producing mineral polymer fillers containing graft peroxide groups.

SUMMARY OF THE INVENTION

It is an object of the present invention to provide a method for producing mineral polymer fillers containing graft peroxide groups, which would make it possible to reduce the grafting temperature and improve the physico-mechanical properties of filled polymers.

To the accomplishment of this end, the invention provides a method for producing mineral polymer fillers containing graft peroxide groups, whereby mineral fillers are treated at a temperature of 50° to 150° C. and a pressure of $1.33.10^2$ to $4.0.10^5$ Pa (1 mm Hg to 4 atm) with organosilicon compounds of the general formula:

$$R_{4-y}SiX_y$$

or $$R'R_{3-z}X_z,$$

where
R is vinyl, allyl or norbornyl,
X is chlorine, alkoxy or acyloxy,
y=1–3,
z=1–2,
R' is methyl, ethyl or propyl,
whereupon the mineral filler containing graft unsaturated groups is separated from the reaction mixture, dried and ozonized with ozone-oxygen mixture containing 4 to 6 percent by volume of ozone at a temperature of −20° C. to +20° C. in an aliphatic saturated monohydric alcohol or aliphatic saturated monohydric acid.

DETAILED DESCRIPTION OF THE INVENTION

The invention is realized as follows. A mineral filler is dried to constant weight and treated in an autoclave with organosilicon compounds of the general formula:

$$R_{4-y}SiX_y$$

or $$R'R_{3-z}SiX_z,$$

where
R is vinyl, allyl or norbornyl,
X is chlorine, alkoxy or acyloxy, y=1—3,
z=1—2,
R' is methyl, ethyl or propyl.

The mineral fillers are readily available compounds produced by the chemical industry. These include aerosil which is silicon dioxide with particle sizes of 10 to 40 mu and a specific surface of $175\pm25$ m$^2$/g; and perlite which is a compound comprising 65 to 75 percent by weight of SiO$_2$, 10 to 15 percent by weight of Al$_2$O$_3$, the rest being Fe$_2$O$_3$, CaO and MgO, and having a particle size of 40 to 100 mu; the mineral fillers may also be glass fiber, oxides of metals, and asbestos.

The temperature in the autoclave is raised to 150° C., and the mixture is maintained at that temperature and a pressure of $1.33.10^2$ to $4.10^5$ Pa (1 mm Hg to 4 atm) during 1 to 10 hours. A mineral filler may be treated with vapor of organosilicon compounds and with 2% to 5% solutions of organosilicon compounds in toluene or decane.

The treatment being over, the unreacted organosilicon compound is washed off with a solvent, and the mineral filler containing graft unsaturated groups is dried at a temperature of 20° to 120° C. The solvent used for washing the product from the unreacted organosilicon compound is a low-boiling hydrocarbon, such as pentane, hexane or petroleum ether.

The product thus obtained contains graft unsaturated groups determined with the aid of a double bond analyzer. These groups account for 0.4 to 5 percent of the total weight of the filler.

The mineral filler containing graft unsaturated groups is then ozonized with ozone-oxygen mixture containing 4 to 6 percent by volume of ozone. The ozonation is carried out at a flow rate of 40 to 60 liters per hour at a temperature of —20° C. to +20° C. in an alcohol or organic acid. The ozonation time is determined by a prescribed amount of hydroperoxide groups. The ozonation being over the product is filtered and dried to a constant weight at a temperature not higher than 40° C. and at a pressure of $1.33.10^2$ to $4.10^5$ Pa (1 mm Hg to 4 atm). The solvent used during the ozonation stage is either methyl and ethyl alcohols, or acetic and butyric acids.

The end product is a mineral filler containing graft hydroperoxide groups. These contain active oxygen and are determined by iodometric titration. The content of graft hydroperoxide groups in the end product is 0,2 to 2 percent of the total weight of the filler.

Mineral fillers containing graft hydroperoxide groups are applicable to the production of filled polymers, such as polyethylene, polypropylene, polystyrene, polyvinylchloride, and ABC polymers.

Mineral fillers according to the invention are advantageous in that they can be added to a polymer at a temperature of 50° to 140° C., i.e. at a lower temperature, as compared to conventional fillers. Mineral fillers of this invention in no way impair the physico-mechanical properties of filled polymers. Besides, the process of producing mineral fillers according to the invention is simpler and safer than those of producing conventional fillers, because it includes the stage of ozonation to introduce peroxide groups into a polymer.

A better understanding of the present invention will be had from a consideration of the following examples illustrating preferred embodiments thereof.

EXAMPLE 1

100 g of aerosil, which is silicon dioxide with particle sizes of 10 to 40 mu and a specific surface of $175\pm25$ m$^2$/g, and 10 g of trichlorovinylsilane are placed in a reaction vessel provided with a reflux condenser. The reaction vessel is then evacuated to a residual pressure of $5.3.10^3$ Pa and warmed up at a temperature of 50° C. during two hours. Upon the end of the reaction, the unreacted trichlorovinylsilane is washed off with petroleum ether, and the product is dried under normal conditions. The product is of the general formula: aerosil

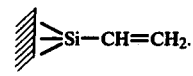

The graft unsaturated groups account for 1 percent of the total weight of the filler.

The 100 g of aerosil with graft unsaturated groups is placed in a reaction vessel whereto 1,000 ml of methyl alcohol is added. An ozone-oxygen mixture containing 4 to 6 percent by volume of ozone and maintained at a temperature of 20° C. is passed through the mixture at a flow rate of 40 to 60 liters per hour during 30 minutes. Upon the end of the reaction, the product is filtered off and dried to a constant weight at a temperature of 20° to 30° C. This end product is a mineral filler which contains graft hydroperoxide groups and is of this formula:

The iodometrically determined active oxygen content is as follows: found, 0.51 percent by weight; calculated, 0.52 percent by weight.

EXAMPLE 2

The process is carried out as described in Example 1, but this time aerosil is treated with ozone-oxygen mixture only during five minutes. The end product is a mineral filler containing graft hydroperoxide groups. It is of this formula:

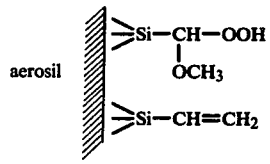

The iodometrically determined active oxygen content is as follows: found, 0.28 percent by weight; calculated, 0.26 percent by weight.

EXAMPLE 3

100 g of aerosil of the composition of Example 1 is placed in a reaction vessel provided with a reflux condenser whereto there is added 1,000 ml of decane containing 15 g of trichlorosilylnorbornene. The reaction mixture is maintained at a temperature of 150° C. during four hours. The reaction being over, the product is filtered off, washed with petroleum ether and dried. The product is a mineral filler of this formula:

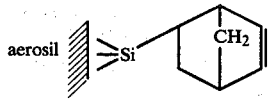

The unsaturated groups account to 1.55 percent of the total weight of the filler.

The 100 g of sylanized aerosil is placed in a reaction vessel whereto 1,000 ml of methyl alcohol is added. An ozone-oxygen mixture containing 4 to 6 percent by volume of ozone and maintained at a temperature of 20° C. is passed through the mixture at a flow rate of 40 to 60 liters per hour during 30 minutes. The product of the reaction is filtered off and dried to a constant weight at a temperature of 20° C. This end product is a mineral filler containing graft hydroperoxide groups and is of this formula:

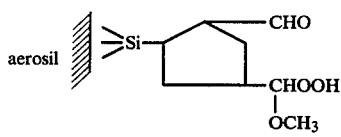

The iodometrically determined active oxygen content is as follows: found, 0.89 percent by weight; calculated, 0.93 percent by weight.

EXAMPLE 4

Glass fiber 4 to 5 mm long and 3 to 5 mu in diameter is treated with hot carbon tetrachloride to remove the greasing agent and dried in vacuum at a residual pressure of $1.33.10^2$ Pa (1 mm Hg) and a temperature of 250° to 300° C.

100 g of glass fiber thus treated is placed in a reaction vessel and 10 g of trichlorosilylnorbornene is added thereto. The reaction vessel is evacuated to a residual pressure of $1.33.10^2$ Pa (1 mm Hg), and the mixture is maintained at that pressure and at a temperature of 150° C. during four hours. The unreacted trichlorosilylnorbornene is washed off with petroleum ether, and the product is dried. It is a mineral filler containing graft unsaturated groups and having this formula:

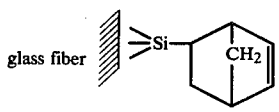

The graft unsaturated groups account for 3.06 percent of the total weight of the filler.

The ozonation is carried out as in Example 1. The end product is a mineral filler containing graft hydroperoxide groups and having the following formula:

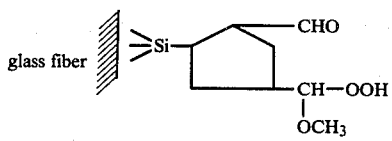

The iodometrically determined active oxygen content is as follows: found, 1.80 percent by weight; calculated, 1.84 percent by weight.

EXAMPLE 5

Glass fabric 0.3 to 0.5 mm thick is treated as the glass fiber of Example 4. The graft unsaturated groups account for 1.93 percent of the total weight of the mineral filler. Following ozonation, the mineral filler containing graft hydroperoxide groups is of this formula:

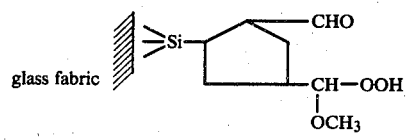

The iodometrically determined active oxygen content is as follows: found, 1.16 percent by weight; calculated, 1.16 percent by weight.

EXAMPLE 6

The process is carried out as in Example 1, but triethoxyvinylsilane is used instead of trichlorovinylsilane. The graft unsaturated groups account for 1.20 percent of the total weight of the mineral filler. The end product obtained after the ozonation is a mineral filler containing graft hydroperoxide groups and having the formula:

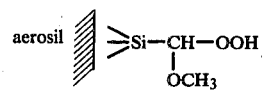

The iodometrically determined active oxygen content is as follows: found, 0.60 percent by weight; calculated, 0.62 percent by weight.

EXAMPLE 7

The process is carried out as in Example 4, but triethoxysilylnorbornene is used instead of trichlorosilylnorbornene. The graft unsaturated groups account for 2.05 percent of the total weight of the mineral filler. The end product obtained after the ozonation is a mineral filler containing graft hydroperoxide groups and having the formula:

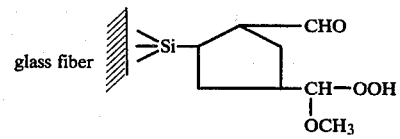

The iodometrically determined active oxygen content is as follows: found, 1.20 percent by weight; calculated, 1.23 percent by weight.

EXAMPLE 8

Perlite, which is a compound containing 65 to 75 percent by weight of $SiO_2$, 10 to 15 percent by weight of $Al_2O_3$, while the rest is $Fe_2O_3$, CaO and MgO, and having particle sizes of 40 to 100 mu, is treated during one hour at room temperature with dilute 5% hydrochloric acid to remove 10 to 15 percent of the surface layers. The hydrochloric acid is then washed off with distilled water to neutral reaction, and the perlite is dried in vacuum at a residual pressure of $1.33.10^2$ Pa (1 mm Hg) and a temperature of 150° to 200° C. The product is reacted with chlorosilane so that the graft unsaturated groups account for 1.58 of the total weight of the filler. The ozonation is carried out as in Example 3. The resultant product is a mineral filler containing graft hydroperoxide groups and having the formula:

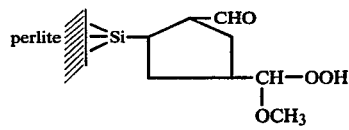

The iodometrically determined active oxygen content is as follows: found, 0.92 percent by weight; calculated, 0.95 percent by weight.

EXAMPLE 9

The process is carried out as described in Example 1, but the ozonation is done in ethyl alcohol at a temperature of −20° C. The product obtained after the ozonation is a mineral filler containing graft hydroperoxide groups and having the formula:

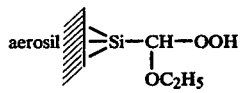

The iodometrically determined active oxygen content is as follows: found, 0.44 percent by weight; calculated, 0.46 percent by weight.

EXAMPLE 10

The process is carried out as described in Example 3, but the ozonation is done in propyl alcohol at a temperature of 0° C. The product obtained after the ozonation is a mineral filler containing graft hydroperoxide groups and having the formula:

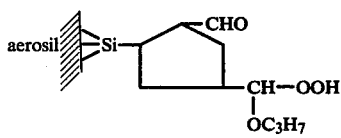

The iodometrically determined active oxygen content is as follows: found, 0.40 percent by weight; calculated, 0.41 percent by weight.

EXAMPLE 11

The process is carried out as described in Example 3, but the ozonation is done in acetic acid during 40 minutes. The product obtained after the ozonation is a mineral filler containing graft hydroperoxide groups and having the formula:

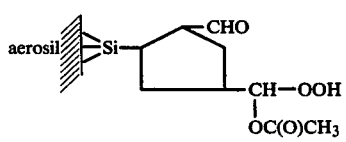

The iodometrically determined active oxygen content is as follows: found, 0.90 percent by weight; calculated, 0.8₁ percent by weight.

EXAMPLE 12

The process is carried out as described in Example 3, but the ozonation is done in butyric acid during 60 minutes. The reaction being over, the product is washed with petroleum ether and dried at a temperature of 20° C. The product obtained after the ozonation is a mineral filler containing graft hydroperoxide groups and having the formula:

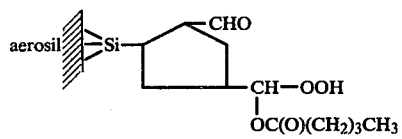

The iodometrically determined active oxygen content is as follows: found, 0.73 percent by weight; calculated, 0.73 percent by weight.

EXAMPLE 13

100 g of perlite having a composition as stated in Example 8 and 20 g of vinylmethyldichlorosilane are placed in a one-liter autoclave. The mixture is evacuated to a residual pressure of $1.33 \cdot 10^2$ Pa (1 mm Hg) and heated during 10 hours at a temperature of 150° C. and at a pressure in the autoclave of $4.10^5$ Pa. After the completion of the reaction the product is washed with petroleum ether and dried at a temperature of 120° C. The product is a mineral filler containing graft unsaturated groups and having the formula:

The graft unsaturated groups account for 1.6 percent of the total weight of the filler. The ozonation is carried out as in Example 1. The product obtained after the ozonation is a mineral filler containing graft hydroperoxide groups and having the formula:

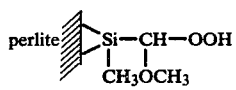

The iodometrically determined active oxygen content is as follows: found, 0.95 percent by weight; calculated, 0.94 percent by weight.

EXAMPLE 14

The process is carried out as described in Example 12, but the organosilicon compound in this case is vinylethyldichlorosilane. The product obtained after the ozonation is a mineral product containing graft hydroperoxide groups and having the formula:

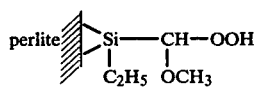

The iodometrically determined active oxygen content is as follows: found, 0.70 percent by weight; calculated, 0.83 percent by weight.

What is claimed is:

1. A method for producing mineral fillers for polymers, said fillers containing graft hydroperoxide groups, whereby mineral fillers are dried to a constant weight and treated at a temperature of 50° to 150° C. and a pressure of 1 mm Hg to 4 atm with organosilicon compounds selected from the group consisting of compounds of the general formula:

$$R_{4-y}SiX_y,$$

where
- R is selected from the group consisting of vinyl, allyl and norbornyl;
- X is selected from the group consisting of chlorine, alkoxy and acyloxy;
- y = 1–3;

or from the group consisting of compounds of the general formula:

$$R'R_{3-z}SiX_z,$$

where
- R is selected from the group consisting of vinyl, allyl and norbornyl;
- X is selected from the group consisting of chlorine, alkoxy and acyloxy;
- z = 1–2;
- R' is selected from the group consisting of methyl, ethyl and propyl, whereupon the mineral filler containing graft unsaturated groups is separated from the reaction mixture, dried and ozonized with ozone-oxygen mixture containing 4 to 6 percent by volume of ozone at a temperature of −20° C. to +20° C. in a reactant medium selected from the group consisting of aliphatic saturated monohydric alcohols and aliphatic saturated monohydric acids and the mineral filler containing graft hydroperoxide groups is recovered.

* * * * *